March 14, 1944.  W. W. ROWE  2,343,930
RESIN MOLDING
Filed April 6, 1940

INVENTOR.
WILLIAM WALLACE ROWE.
BY Allen & Allen
ATTORNEYS.

Patented Mar. 14, 1944

2,343,930

UNITED STATES PATENT OFFICE 2,343,930

RESIN MOLDING

William Wallace Rowe, Cincinnati, Ohio, assignor to Cincinnati Industries, Inc., a corporation of Ohio Application April 6, 1940, Serial No. 328,325

25 Claims. (Cl. 18—55)

My invention is addressed to the art of making molded articles and to the solution of certain problems in the art which have hitherto, so far as I know, not been solved at all. I shall describe my invention in connection with the molding of articles comprising synthetic resins, as an exemplary embodiment, it being understood however that such resins are not the only molding substances in the use of which my invention has utility.

Procedures in the resin molding art have hitherto fallen within certain mutually exclusive classes. For the manufacture of irregular articles in closed molds it has been the practice to use resinous molding powders. These powders are softened by heat during the molding step and can flow to fill all of the interstices of a complicated closed mold. Although resinous molding powders may contain some very fine fibrous reinforcement such as wood flour, yet articles molded in this way have been characterized by relatively lesser strength and poorer shatter resistance than the laminated materials next to be described. Where greater strength and impact- and shatter-resistance are desired, it has been the practice to build up laminae of webs saturated with resin and to press and cure these, usually between plates. Thus paper and cloth have been saturated in resinous varnishes, dried, cut to size, stacked in a press between pressing pans, or sometimes in a closed mold and pressed and cured to give strong and resistant structures. The great bulk of laminated resinous products are made first in the form of panels or blocks; and where articles of more complicated shapes are desired, it has been the practice to cut these articles from panels or blocks by stamping, dieing, or machining operations. Thus by way of example, where resinous gears are desired, the practice has been to form laminated resinous stock in panel shape of the desired thickness, cut it apart into blocks and cut gears from the blocks by methods analogous to the gear cutting methods which are applied to metal.

In certain operations also, pulp preforms are made approximately to size and shape, are saturated in resin after drying, and are pressed and cured. This procedure is of limited application. Again felted products have been made of pulps containing resin, and these products have been pressed and cured in molds. Neither of these procedures produce laminated articles as that term applies to the known resinous panels.

The use of chopped-up papers or cloth which have been saturated in resin has been proposed. This gives a better fibrous reinforcement than can be obtained with resin molding powder, and permits greater latitude of shape, than can be secured in the making of resinous panels. However, no truly laminated structure is secured. It is possible to cut laminae into different shapes and assemble a plurality of different shaped laminae in a closed mold so as to secure an article which is thicker in some parts than in others as molded. This procedure is inconvenient and relatively expensive, as well as restricted in the matter of posssible shapes.

Thus it has not hitherto been possible to produce laminated resinous articles by molding where the shape of the articles was such as to require plastic flow in the mold; and on the other hand it has not been possible in resinous articles produced by plastic molding to secure physical characteristics comparable to the physical characteristics of laminated resinous products.

It is an object of my invention to provide a method in which molded articles of truly laminated character can be inexpensively produced by molding procedures involving plastic flow in the mold. It is an object of my invention to provide a laminated resinous material which can be caused to flow in the mold without losing its laminated character. It is an object of my invention to provide laminated articles of complex shape which are formed by direct molding and which are complete and accurate as to finish and dimensions, as molded. It is an object of my invention to secure in articles molded by plastic flow physical characteristics comparable to those hitherto obtainable only in laminated resinous products pressed and cured in block or panel form. It is an object of my invention to provide a new molding substance and mode of using it whereby the physical and economic advantages inherent in the main former procedures can be simultaneously secured.

My invention, as will hereinafter be pointed out, bridges the gap between the molding by plastic flow of molding powders and the flat pressing of laminated structures, and provides a new technique and a new range of products such that laminated articles of complex shape can be produced by methods and at costs comparable to non-laminated articles. It also permits the production of laminated articles having complex and textured surfaces. Hitherto when laminae were assembled for the production of a panel, for example, it has not been possible to produce on the panel highly configured or textured surfaces or surfaces of complex shape. It has been suggested that a covering of molding powder imposed upon a stack of laminae be employed for producing complex surface configurations; but when this is done, aside from difficulties encountered in attempts to mold molding powders in an open mold, the complex surface configurations, even if successfully formed, were not reinforced and did not have the physical characteristics of the body of the panel. It is an object of my invention to provide a means whereby, in connection with molded bodies of any type, complex surface configurations may be formed, which surface configurations are completely reinforced and are of laminated character. This aspect of my invention is not limited to the production of textures or other complicated surface configurations on panels. I am, for example, in the practice of my invention able to make gears of laminated character and having strength and impact resistance comparable to laminated products by direct molding operations in which the article is removed from the mold in finished condition.

These and other objects of my invention which will be set forth hereinafter or will be apparent to one skilled in the art upon reading these specifications, I accomplish by that certain procedure, through the use of those certain materials and in those certain articles of which I shall now describe exemplary embodiments.

Reference is now made to the accompanying drawing wherein—

I have discovered that if a web of bibulous material be gathered so as to be stretchable, preferably in a plurality of directions, and if it be treated or impregnated with a resin in an incompletely polymerized condition, one or a plurality of plies of such materials may be assembled in a mold and molded under conditions in which the mold charge will flow as a plastic without losing its laminated and hence its reinforced character. My laminated materials are capable of plastic flow, which in its narrowest sense I define as that property of a material which, when the material is placed in a closed mold of different shape, enables it to flow under pressure and fill all of the interstices of the mold so as substantially to even up the pressure on all parts of the mold. In a somewhat broader sense, plastic flow may be thought of as the property of a mold charge of one shape to conform to a mold of another shape wherein such conformation involves flowing movement or displacement of different parts of the mold charge with respect to each other. Plastic flow is also exemplified in that property of a material which enables its surface to conform to a mold surface of radically different shape where parts of the mold charge surface must move toward or away from each other. My materials possess the property of plastic flow in all of these senses and yet are laminated materials and retain their laminated character in spite of plastic flow. So far as I know this property has not hitherto been attained in molding materials.

I am not limited as to the nature of the webs which my laminae comprise. In the resin molding art felted fibrous materials, of which paper materials are exemplary, and woven or textile materials such as cloth are employed; and my invention is applicable to both.

This application is a continuation in part of my copending application entitled Embossed decorative fabrics, Serial No. 225,822, filed August 19, 1938, insofar as it embodies the same disclosures relative to the preparation of molding substances and the molding thereof.

Figure 2:
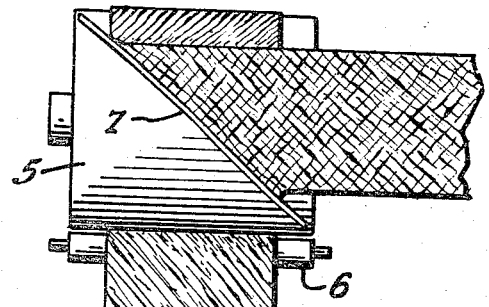
Figure 2 is a semi-diagrammatic plan view of an apparatus for creping the web and imparting thereto stretchability in all directions.

In the preparation of laminated resinous materials capable of plastic flow, I take suitable webs and contract them so as to give them the quality preferably of multi-lateral stretchability. The contraction may be effected in a number of ways; but I prefer to effect it by creping the web. By creping I mean a condition of a web such as is produced by causing it to adhere to a creping surface and crowding it back on itself by a creping knife which crinkles it and removes it from the surface. Compression creping can also be employed as well as any method of producing relatively fine and uniform gatherings. I prefer that the web shall be multi-laterally stretchable and consequently I prefer that it be creped in two directions at least, under such circumstances that the creping crinkles cross each other. While this again may be accomplished in several ways, I prefer to employ the process and apparatus set forth in Patents No. 2,008,182 and No. 2,008,181 in the name of Kemp. In that process and on that apparatus a web 1 (Fig. 2), while in continuous longitudinal motion is first creped with a series of creping crinkles lying diagonally to the major axis of the web by being caused to adhere to a creping cylinder 2, against which it is pressed by means of a pressing roller 3. The surface of the web is coated at least on that side which comes against the creping cylinder by a creping adhesive as hereinafter set forth. The web is removed from the surface of the cylinder by means of a doctor or knife 4 which contacts the surface of the cylinder along a substantially helical line and thus effects the removal of the web along a line diagonally disposed to the direction of movement of the web. In this way creping crinkles are imparted to the web aslant to the major axis of the web. Then the web is again creped so as to be given a diagonal set of creping crinkles oppositely directed to the first set so as to cross them. The web is led to a second creping cylinder 5 to which it is caused to adhere by means of the binder on its surface. It is pressed against the surface of this cylinder by a roll 6, and is removed therefrom by a helical creping knife or doctor 7. Webs so produced, though bulked in thickness, are of substantially uniform effective thickness and are to be preferred for the purposes of my invention.

Where the laminae are of paper, creping seems to prepare the sheet for complete saturation during the molding, thus permitting the use of cheaper papers and a wider range of available papers. For example, laminators cannot ordinarily employ common kraft papers, but go to special open sheets and special bibulous papers. Thus, a wider choice of papers constitutes one of the advantages of my process. Further, the creping undoubtedly plays an important part in making possible the use for molding of coated as distinguished from saturated papers, where that is desired.

Webs creped by the positive adhesive action of a thermoplastic adhesive susbtance are generally characterized by a finer and more uniform character of the creping, and this also is advantageous. In the production of multi-laterally stretchable papers by the process of the Kemp patents, it is usual to employ a positive creping adhesive such as asphalt. Webs creped in this way may have the asphalt removed as by a solvent, and later may be saturated in a resinous varnish to form laminae for my mold charges. Also in instances where a quantity of asphalt in the resin is not undesirable, resin may merely be added to asphalt creped sheets. The presence of asphalt in a web may in instances be desirable as a waterproofing agent for the fibers, making the ultimate product less susceptible to dimensional change due to moisture. What has been said of asphalt as a creping adhesive will also apply to rubber, various waxes and gums, and combinations of substances.

But the handling of creped webs through the ordinary saturating pans involves some difficulties in that stretchability in the web is likely to be diminished through handling or squeezing or doctoring. The addition of resin to the web by spraying is effective, yet it is not the most convenient or most economical procedure. As a consequence I prefer to crepe the webs in the presence of the resin. I also prefer to employ the resin as the creping adhesive rendering the use of super-added adhesive substances unnecessary, altogether or in part.

Summarizing briefly the ways in which a resin bearing creped web may be produced I call attention to the following:

1. The web may first be creped and afterward treated with the resin.

2. The web may first receive a treatment in a suitable resinous varnish and then after drying may be creped by means of a suitable adhesive such as asphalt or rubber.

3. The web may be treated with a resinous varnish, i. e., a solution of an incompletely polymerized resin in a solvent, usually water or alcohol or both, and then the resin may be brought to a proper consistency to serve as the creping adhesive and the web thus creped by means of the resin.

4. Or an A-stage resin may be employed which is in liquid or semi-liquid condition and the web saturated or coated therewith, the resin afterward being brought to the proper consistency to serve as the creping adhesive.

5. Again, a resin capable of being melted by heat under conditions so controlled as to prevent the premature setting up of the resin may be used as a coating or saturating substance as well as a creping adhesive.

6. Or the web may be led to a creping cylinder in coated or uncoated, or saturated or unsaturated condition, and resin may be added to the web by or on the creping cylinder or surface. Thus the creping cylinder may have a softened or liquefied resin applied to it, or a powdered resinous substance may be dusted either on the web or the cylinder or both and brought to the proper consistency for creping by heat.

Figure 1:
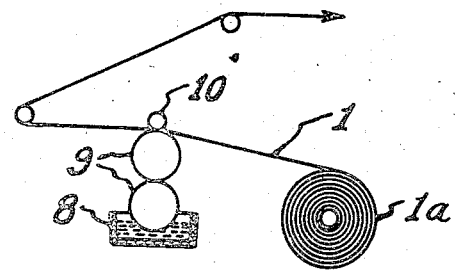
Figure 1 is a semi-diagrammatic elevational view of an apparatus for imposing a thin coating of resin on a web.
Figure 3:
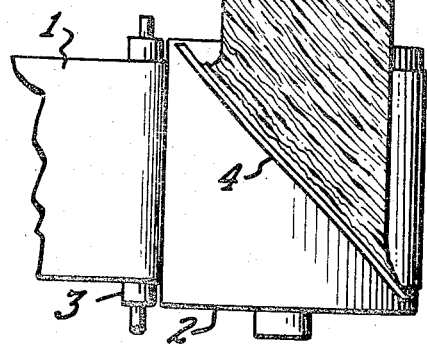
Figure 3 is an elevational view of an apparatus for saturating the web produced on the machine of Figure 2.

7. Again, I may crepe a web by means of a small quantity of resin, either as a continuous or discontinuous coating, where the quantity of resin is too small to give me the desired qualities in the final molded product. Thus in Fig. 1 I have shown the web 1 being withdrawn from a roll 1a, and coated with a thin coating of resin from a pan or the like 8 by means of a series of coating rolls 9 being pressed against the last of these by a roll 10. Then after creping I may cause this quantity of resin to set up to the point of making the creped web sufficiently resistant to the removal of stretch to permit the handling I desire. Then I may associate with the web the unpolymerized resin desired for molding in any way desired. A web so treated may frequently be handled in ordinary saturating pans. In Fig. 3, the creped material is withdrawn from the coil 1b and passed through a saturator of ordinary form indicated generally at 11. In a saturation chamber 13 it is drawn through a pan 12 containing the resinous varnish. Afterward it is drawn through the drying chamber 14.

8. Again, the resin may be added to the web before or during the crinkling operation without necessarily affecting the crinkling operation. For example, a web may be water-creped, and resin added to the web on the creping drum. Or as a water bath, I may employ a water solution of incompletely polymerized resin. A resin varnish, whether the solvent be water, or alcohol, or a mixture of substances, will assist in forming a vacuum seal to help hold a web to a creping cylinder. In applying resin to a web during creping, the resin may be applied to the web before it reaches the creping surface, or to the creping surface so as to be transferred to the underside of the web, or to the upper side of the web while on the creping surface. In following the creping procedure of Kemp referred to above, I may water-crepe the web on the first cylinder, then, after causing the web to adhere to the second cylinder, I may apply the resin to the web between the press roll of that cylinder and the creping doctor, thus avoiding the passage of a resin-coated face of the web against any press roll. Also, where the crinkling step is one requiring drying of the web by passing it over driers, resin can be applied at the driers.

In employing a resin as a creping adhesive it may be applied to the web as a superficial coating only, or in such a way as to saturate the web; or the web may be both saturated and coated. Further, the use of a resinous substance as a creping adhesive does not preclude the addition of further resin to the web prior to molding, if this be desired. In any event, the problem of creping by means of a resin involves the association of incompletely polymerized resin with the web and the carrying on of the creping operation, all under conditions which will not set up the resin and bring it to a stage of final polymerization before the molding step.

As to the operation of creping, it may be pointed out that as in creping with other adhesive substances as, for example, in my Patents Nos. Re. 17,633 and 1,782,767, it is necessary that a proper bond between the web and the creping surface be attained by means of the adhesive and where the adhesive exists in a relatively thick layer on the surface of the web it is necessary that the adhesive have sufficient cohesion to crepe with the web. Considering method No. 3 above, the resin may be brought to the proper condition of cohesion and bond by the elimination of solvent from the varnish or by heat or both. If the web had a thick coating of resin, the requisite cohesion in the resin film must be greater than if the resin film is thin. In coating the web with a resinous varnish, I prefer to employ a varnish containing less solvent than is usual in saturating pan practice.

In a commercial operation which is a variant under 3 above, I am employing an alcohol resin solution in which the resin has been polymerized to such an extent that the dried film is non-tacky at room temperature but can be made tacky by a practical degree of heat. I apply the solution in the cold to paper taken from a roll, then pass it through a drying oven. The paper may merely be coated, or this part of the apparatus may if desired be similar to current saturating-pan and drying apparatus. The paper can be cooled and re-wound into rolls without sticking, or the apparatus thus far mentioned may be located ahead of a creping apparatus in a complete installation. The paper is passed over the creping apparatus without further treatment, and adhesion is brought about by raising the temperature of the creping drums to the point where the resin bonds satisfactorily. After creping, the paper can again be cooled and wound into a roll without sticking.

In following such a procedure I am able to use a resin which has a known and controlled degree of advancement, and because I apply it to the paper cold, I do not run the danger, nor am I under the necessity of advancing it further before creping. Very little advancement takes place during drying, or at least the advancement here can be controlled. Advancement during the creping operation is negligible, because heat is applied by the warmed drums to the paper only for a matter of a minute or less (depending upon the speed of the machine) and the paper is immediately chilled. By this procedure a very uniform product can be made.

In No. 4 type of operation, an A-stage resin of the so-called "one-step" type will be employed and may carry an accelerator. This resin is a liquid or semi-liquid and usually contains water which may be eliminated to a greater or less degree in bringing the resin to the desired state of cohesiveness and adhesiveness. In operating by this method I ordinarily use an A-stage resin containing up to 85% solids. Care must be exercised in applying heat to such a resin for tempering purposes to avoid setting up the resin. The application of heat, however, it will be noted, may be local rather than general. Thus I may employ a creping cylinder or one or more rolls ahead of the creping cylinder which are heated, and I temper the resin at such points rather than attempt to temper the resin in bulk. The starting material may be chosen, and the process so controlled as to secure the desired stage of resin advancement.

In operation No. 5 the hot melted resin is usually what is known as a "two-step" type and as used for creping may or may not contain an accelerator. The accelerator may be added either by means of the web (which may have been saturated in accelerator and dried), or accelerator may be dusted onto a resin coated side of the web before or after creping. Also accelerator may be added to the free side of a web during creping while the web is bound to the creping surface by the two-step resin. To some two-step resins it is possible to add some accelerator initially (as by mixing say 2% to 5% of accelerator with the melted resin) and add the remainder of the accelerator to the web. This procedure in some cases gives better control during molding, because it permits advancing the resin to any desired degree prior to molding. Accelerator may be mixed with the resin in small batches immediately before coating and cooling of the web.

My invention also contemplates creping by means of one kind of resin and the addition of one or more other kinds of resin to the web during or after creping as, for example, by spraying.

In operation No. 6 I have found that it is possible to coat a creping surface or a web with powdered resin and at the creping surface bring this resin to a sufficient tack for creping purposes although coatings formed in this way are not as uniform. Usually webs creped in this manner will require the addition of more resin. Resin saturated webs, however, may be creped in this manner, as will be clear.

As a variant procedure both under 6 and 7 I may apply a dilute solution of resin or other adhesive directly to the surface of one or both of the creping drums. The temperature and other conditions may be so arranged that this dilute film will become dry before the web is pressed into contact with it. Heat in the drum may cause the resin to bind the web to the drum. In this way I am able to make a creped paper with so little resin on its surface as to be to all intents and purposes invisible. The paper may be saturated, coated or otherwise treated with additional resin.

The complete polymerization of such a small amount of resin as is applied in this way in creping the web will not affect the final product. Where it is desired to set up the creping resin to facilitate the handling of the web, this may be done by passing the web through an oven.

While I have mentioned resins and accelerators above, it will be understood that various addition agents such as plasticizers, lubricants, graphite, asphalt, wax, stearic acid and the like may be present in the resins, or may also be added to the web. The quantity of resin in the web per unit area will be varied in accordance with good molding requirements and the desired total quantity of resin in the finished product. The same resin or different resins may be added to the web in different increments at different times as I have indicated. For example, it is possible while creping with resin on one side of a web to add resin to the other side of the web by roll coating, spraying or the like while the web is on the creping cylinder, and before it reaches the creping doctor. With papers, the ultimate penetration of the web by the resin is facilitated by the opening-up action of the creping step upon the felted paper fibers, as explained above.

It will be understood that in crinkling or creping a web in the presence of an adhesive, which may be the resin or other binder, or some other substance, the adhesive may be employed in such quantity and viscosity as to cement the crinkles together so as to maintain the web in crinkled condition. This may be of importance in the handling of webs so limp as to be incapable of holding a crinkled condition, or having too great a tendency to lose stretchability during handling, e. g., cloth of certain kinds. Or I can crepe a limp web in adhesive union with a web stiff enough to maintain the crinkles in both. Thus paper may be creped in adhesive union with cloth. The combining may, if desired, be done on the creping surface, either by applying adhesive to the paper or by applying it to the cloth or both.

In the production of webs gathered otherwise than by creping, the web may likewise be treated with the resin before, during, or after the gathering step. In the light of the teachings above, it will now be clear, for example, how resin may be employed as the corrugating and/or creping adhesive in the making of corrugated and creped paper by the process of my copending application Ser. No. 319,641, filed February 19, 1940, and entitled Creping corrugated papers, and in my Patent No. 2,190,680.

My invention is applicable to any of the synthetic resins suitable for molding purposes, including but without limitation, the phenol-aldehyde resins, the urea-aldehyde resins, the vinyl resins and others. I have mentioned above a number of problems in connection with the use of the thermal setting resins, which problems do not obtain or are not as severe in the use of those resins which remain continuously thermoplastic. Also my invention is not limited to synthetic resins as such, but may be employed with other binder substances suitable for molding and including but without limitation natural resins whether thermoplastic or thermal setting, rubber, rubber compounds and other polymerizable or non-polymerizable binders.

All of the teachings above are applicable to felted fibrous substances and to textile and woven substances alike; and are not restricted to these since they are likewise applicable to amorphous sheet-like substances such, for example, as regenerated cellulosic materials. Amorphous substances may or may not be susceptible to saturation; but a saturated condition of the substances is not a limitation upon my invention. In these specifications and the claims which follow, I use the term "web" as a broadly inclusive term; and the term "web in association with binder" (or resin) is inclusive of a saturated condition, a coated condition, or both.

The effects which I secure in molding through the use of my novel laminae are dependent upon this discovery: that gathered laminae, when subjected to transverse pressure, will elongate locally in the plane of the laminae, and hence "flow under pressure", as defined above. The action, in areas of initially heavier pressure is one of sidewise displacement whereby stretchability is realized in the laminae; and the laminae can "flow" without rupture up to the limit of their stretchability. The limit of their stretchability will of course depend upon the degree of initial gathering. The action in areas of initially lesser pressure is one of crowding together, or further gathering. The "realization of stretchability" to which I have referred is not dependent upon the exertion of any pull on the web; therefore it is to be distinguished from stretching due to a drawing action, such an action as occurs when sheet metal is clamped about its edges and its center displaced so as to form a cup-shaped article. This constitutes stretching by means of a pull. It will be realized that in many molding operations a drawing action will be present along with plastic flow; and such instances are contemplated in my procedure. The most important characteristic of my laminated materials, however, is that as mold charges they have the property of plastic flow without loss of their laminated character. The plastic flow actions described above occur in the presence of the binder which will be rendered non-solid during the molding (as distinguished from the curing) stage.

Moreover, if due to a drawing action in some types of molding operations occurring as the mold parts approach each other there should be a wrinkling or pleating of the laminae, the property of plastic flow which my materials possess prevents a macerating or cutting of the plies, and allows the displaced material to flow to its proper final position. The property of plastic flow further prevents the placing of the fibers of the web under disruptive strains during molding so long as flow can occur.

If the laminae as assembled for molding were unsaturated in whole or in part, they will absorb binder during the molding. The total weight of binder solids in relation to web solids may be apportioned by the worker with my materials by the same formulae and in the same amounts as obtain in current molding or laminating practice. That is to say, the percentage of binder may vary from just enough to hold the article together in the final molded product to an amount greater than the other solids present depending upon the qualities desired in the finished article, and in the same way.

Moreover the handling of my laminae may be the same as that dictated by current good technique, remembering, however:

1. That my laminae, because they have the property of plastic flow, can be used for the molding of articles not hitherto capable of being molded with laminated structure.

Figure 4:
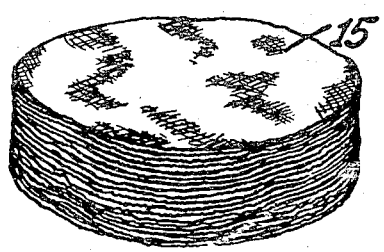
Figure 4 is a perspective view of an exemplary mold charge made from my webs.
Figure 5:
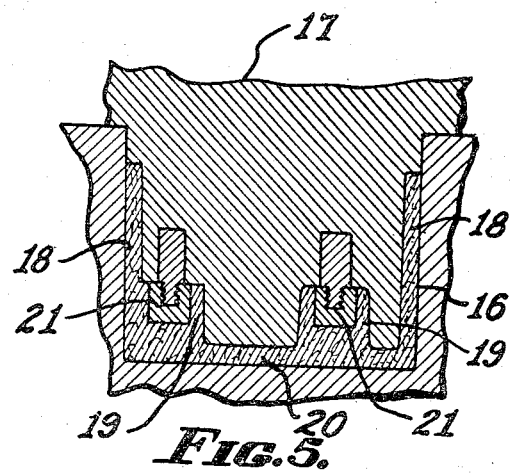
Figure 5 is a sectional view showing a mold and the contained article which has been formed from my moldable material.

2. That mold charges may thus be made from my laminae, which mold charges will flow in the mold so that they need not have an initial shape similar to that of the mold cavity. In Fig. 4, I have shown a mold charge 15 consisting of stacked laminae of my creped webs with which a resinous binder has been associated. The mold charge is placed in the cavity of a female mold member 16 in Fig. 5. When pressed therein under conditions of heat by the male mold member or plunger 17, the material will flow and fill all of the interstices of the mold. The exemplary article of the figure is a cup-shaped article having bosses or the like on the bottom, within. Flow is exemplified in the formation of the side walls 18 of the article, and in the migration of material from thinner bottom areas as at 20 to the bosses 19.

3. That mold charges may be made of my materials and used in closed molds.

4. That a gathered web is a bulked web, so that a stack of my laminations is likely to be thicker initially than a mold charge of other materials. For this reason it is, in instances, a matter of convenience to pre-ply and perhaps compact my laminae and cut mold charges from the pre-plied substance.

5. That the amount of plastic flow without rupture of laminae in my materials bears a relationship to the amount of stretch put into the laminae by the gathering, and that it is preferable to prepare a mold charge of such shape that the required amount of plastic flow in any given direction does not exceed the capability of the material to flow in that direction without rupture of laminae. There is a theoretical limit of compressibility where the material is free to flow, which limit is the compressibility of the laminae without rupture after all stretch has been removed from them by flow. Certain articles, of course, may require a draw beyond the stretchability of the material. In most of such cases, a slip-ring die may be used, or pressure pads; but it will be evident that a somewhat similar action may occur between different areas of the material in a closed mold.

6. That in preparing a mold charge, laminae or preformed groups of laminae of different shapes may be assembled in one mold to take care of gross inequalities in thickness or shape as between different parts of the mold cavity.

7. That because of the property of plastic flow which is possessed by my materials, they are not generally so suitable for molding in an open mold as other laminae unless the number of laminae is quite small. In molding a heavy panel-like article where my materials are employed to give a reinforced surface texture or reinforced surface configurations, it is preferable to form the body of the article of laminae not having the property of plastic flow or to employ some laminae not having the property of plastic flow along with my laminae for the purpose of holding the material between the pressing pans forming the open mold.

8. That laminae not having the property of plastic flow may be combined with my laminae in the formation of mold charges to be used in closed molds in different parts of the mold charge if desired so that the property of plastic flow may be given only to such parts of the mold charge as are required to flow as a plastic in the closed mold.

9. That because of the property of plastic flow which is inherent in all parts of the laminae made in accordance with the teachings herein, articles of simple or complex shape may be made by introducing into the mold pieces or scraps of laminae or small pieces of pre-plied laminae and the like, or by wadding or ramming sheets of my materials into the mold, and in this way articles may be made, all parts of which are reinforced with web materials and articles all parts of which are substantially homogeneous as respects the distribution of the same quantities of resin and reinforcement. This is to be distinguished from former procedures using chopped-up paper or cloth. In my procedure each separate piece of material is capable of individual flow. Not only, therefore, is the fibrous part of the article better distributed, and uniform throughout, but I avoid that condition of islands of compressed fiber at some points and areas of clear resin at others.

Such use in the first place furnishes an outlet for scrap resulting from the formation of mold charges as described above, and is a correct procedure for the formation of a wide variety of articles. It should be noted, however, that such articles differ from articles of the mold charges first hereinabove described in that the laminae are not continuous throughout the article. Such articles have greater strength and shatter-resistance than articles otherwise made, together with a better distribution of the fibrous reinforcement; but articles in which the laminae are continuous throughout substantially all parts are still stronger and have still greater shatter-resistance.

10. Because of plastic flow my material will surround inserts, reinforcements and the like not only with great accuracy but with complete homogeneity so that the inserts and reinforcements are very firmly bound. Inserts are shown at 21 in Fig. 5.

11. My articles will not chip readily and have impact qualities superior to articles made of molding powders. The design of the articles may frequently be varied accordingly.

It goes without saying that my laminae should be thoroughly dried before pressing and curing and should be free of substances and conditions tending to produce blistering and delamination. This is, of course, equally true of any procedure involving the pressing and curing of laminae. Pre-plying and consolidating the mold charges is frequently of assistance in preventing blistering.

It will be understood from what has been said above that my materials permit the molding of articles of complex shape which are nevertheless laminated in construction, that they permit the molding of articles of complicated shapes having superior strength and shatter-resistance because of superior reinforcement, and that they permit the production of articles by molding which hitherto could be made only by shaping from pre-cured masses. The plastic flow properties of the laminae tend to inhibit separation of resin from the laminae due to pressure. Except for the preparation of the laminae per se and the preparation of mold charges as hereinabove indicated, the method of molding and curing the plastic materials may be the same as methods currently employed and capable of the same controls. The resin in my laminae may be advanced before or after fabrication of the laminae themselves to whatever stage is deemed desirable prior to the actual molding. Note that my laminae, however, may be coated rather than saturated, and are capable of absorbing resin during molding. It is possible to add resin for molding, by dusting powdered resin between laminae, where the laminae as formed contain an insufficient amount of resin for some particular use. As illustrative of the capabilities of my materials and the utility of my process, I will outline certain procedures, it being understood that these are exemplary only of fields of utility inherent in my invention.

For the formation of resinous gears for example, I provide a mold the female portion of which is formed about the periphery of the cavity with reverse counterparts of the teeth desired on the gear. The male mold member about its periphery has a conforming shape. In molding a gear I cut a series of laminae or a pre-plied stack of laminae to form a circular charge having an outer diameter somewhat less than the diameter of the free space of the female mold cavity. The laminations therefore as assembled or stacked in the mold to which I refer will lie inside of the configurations in the mold cavity which will form the gear teeth. When the mold is assembled and heat and pressure applied, the mold charge will flow as a plastic laterally so as to fill the spaces for forming the gear teeth. In so flowing the web portion of the laminae will itself flow to form the gear teeth so that at the conclusion of the molding and curing operation a gear is removed from the mold which is completely formed and in final shape with accurate teeth, the teeth themselves being of laminated structure and the whole article approximating the qualities of a resinous gear which has been machined or hobbed from a preformed and pre-cured resinous panel or block. For the formation of very large gears or gears with very large teeth, the mold charge may be precut to a shape substantially corresponding to the mold cavity but smaller in its dimensions transverse to the line of pressure application. Upon the application of pressure the material, including the webs, will pressure the material, including the webs, will flow laterally to fill all of the space of the mold.

Again in forming matrices for embossing, printing, or the like, I may superpose one or a plurality of my laminae upon the face of a mold member which is a reverse counterpart of the matrix I desire to produce. The laminae may be pressed and cured between the matrix mold referred to and a substance capable of sustaining the pressure and heat of the molding operation and capable of forcing my laminae into intimate contact with the matrix mold member. Or my laminae may be bonded directly to some supporting structure such as insulating board. The operation may be carried on under open mold conditions; and very little trouble will be had in keeping the material in the mold if the number of my laminae is small. Where a heavy bodied, completely resinous matrix is desired to be formed by pressing a substance between a planar pressing pan and a textured pressing pan, I prefer to assemble upon the planar pan a number of ordinary laminae to form the body. These laminae do not have the property of plastic flow and therefore serve to hold my laminae (which will be superposed upon them) in the mold. A sufficient number of my laminae will be employed to fill the interstices of the matrix mold member by plastic flow. In this way panels may be formed with heavier textured embossed or configured surfaces in which the configurations are thoroughly reinforced and compare in strength to the strength of the body.

Due to the ease and exactness with which my materials can be made to conform to surfaces, they are of especial value in the molding of articles which must have metallic inserts and the like. Also as illustrative of this same property, my materials in a strip form may be wound on wire or rods and molded to desired shapes thereon to provide protective or insulative covering for such wire or rods.

Yet again, my materials due to the property of plastic flow are of especial value in plying materials together, as thin layers of wood, one to another, or paper or cloth to wood and the like. My laminae used as plying material does not require as careful preparation of the surfaces of the materials to be fastened together.

I have explained above how the property of plastic flow may be realized in my laminae up to the extent of the stretchability therein due to the pregathering, at any given area. If the material is of such character that it tends to flow further at any point than the stretchability of a lamina will permit, that lamina may be ruptured; but this may not unduly impair the general strength if there are a sufficient number of unbroken laminae at the point. For some uses I am able to employ laminae which have been gathered in but one direction in a molding operation requiring plastic flow in more than one direction. I may stack my laminae in such a way that alternate ones are capable of stretching in alternately transverse directions. Some of the laminae therefore may disintegrate in one direction while the remainder flow, but adequate articles may frequently be made in this way.

Modifications may be made in my invention without departing from the spirit of it. Having thus described my invention what I claim as new and desire to secure by Letters Patent is:

1. As a new molding material, a creped web characterized by gatherings in the nature of minute folds whereby the web is capable of expanding by unfolding without loss of its integrity as a web, and a moldable plastic in substantially uniform association with said web, said plastic being of such nature and in such quantity that, under heat and pressure, the said material as a whole has the property of plastic flow from regions of high pressure to regions of low pressure in a closed mold, while preserving substantially the same uniform association between the web and the plastic.

2. The material claimed in claim 1 in which said web is a web of gathered cloth.

3. The material claimed in claim 1 in which said web is a web of paper gathered in two directions so as to have the property of universal expansibility.

4. The material claimed in claim 1 in which said plastic is a synthetic resin.

5. As a new molding material, a laminated mold charge comprising a plurality of laminae of creped web material characterized by gatherings in the nature of minute folds whereby the web material is capable of expanding by unfolding without a loss of integrity as webs, and a moldable binder in substantially uniform association with said laminae, said binder being of such nature and in such quantity that, under heat and pressure, the said laminae are capable of flowing bodily as a plastic substance from regions of high pressure to regions of low pressure in a closed mold, plastic flow of said moldable binder being accompanied by and producing concurrent movement of said laminae so as to preserve the laminated character of said mold charge.

6. The material claimed in claim 5 in which one at least of said laminae is a web of paper creped so as to be multilaterally stretchable.

7. The material claimed in claim 5 in which all of said laminae are creped so as to be multilaterally stretchable, and in which the entire mold charge is capable of flow in all directions without loss of its laminated character.

8. The material claimed in claim 5 in which said binder is a synthetic resin.

9. The material claimed in claim 5 in which said binder is a synthetic resin so associated with said laminae as to exist primarily as a superficial coating thereon in said mold charge.

10. The material claimed in claim 5 in which one at least of said laminae is a creped web with the binder in an association therewith such as is produced by creping the web by means of the binder, employing the binder as a creping adhesive.

11. The material claimed in claim 5 in which said laminae are of relatively hard, sized and non-bibulous paper, and in which, in said mold charge the binder exists primarily as a superficial coating for said laminae, but in which the creping of the paper has increased its capacity readily to absorb said binder during molding.

12. The material claimed in claim 5 in which the said binder is an incompletely polymerized synthetic resin, said resin being a two-stage resin existing in part at least as a coating for the laminae, the laminae bearing in their interstices an accelerator for said resin.

13. The material claimed in claim 5 in which the said binder is a thermosetting synthetic resin in an incompletely polymerized condition.

14. A process of molding an article by plastic flow which includes providing a mold charge comprising a moldable plastic in substantially uniform association with a gathered web characterized by minute folds and capable of expanding by unfolding without loss of its integrity as a web, said plastic being of such nature and in such quantity that, under heat and pressure, the said material as a whole has the property of plastic flow from regions of high pressure to regions of low pressure in a closed mold, locating said charge with reference to a mold having a different configuration from that of the charge, and subjecting said charge in said mold to pressure to cause said plastic and said web to flow in response to said pressure to assume the configuration of the mold while preserving in the finished molded article substantially the same uniformity of association between said plastic and said web.

15. A process of molding a laminated article by plastic flow which includes providing a laminated mold charge comprising gathered webs, characterized by minute folds and capable of expanding by unfolding without loss of integrity as webs, in substantially uniform association with a moldable plastic, said plastic being of such nature and in such quantity that, under pressure, the said webs and plastic as a whole has the property of plastic flow from regions of high pressure to regions of low pressure in a closed mold, locating said charge with reference to a mold having a different configuration from that of the charge, and subjecting said charge to pressure in said mold to cause said plastic and said webs to flow in response to said pressure to assume the configuration of the mold while preserving substantially the same uniform association between the webs and the plastic.

16. The process claimed in claim 15 in which said plastic in the mold charge is an incompletely polymerized synthetic resin, and in which heat is applied along with pressure during molding to the extent of completing the polymerization of said synthetic resin in the said molded article.

17. The process claimed in claim 14 involving the step of wadding a desired weight of said web into the mold prior to the application of pressure thereto.

18. A process of molding a laminated textured article which comprises assembling between pressing means, one at least of which has a textured surface, a laminated charge including a creped web characterized by minute folds and having the property of expanding by unfolding in substantially uniform association with a moldable plastic, said plastic being of such nature and in such quantity that, under heat and pressure, the said web and plastic as a whole has the property of plastic flow from regions of high pressure to regions of low pressure in a closed mold, said gathered web lying next the textured surface of said pressing means, and pressing said laminae in said pressing means to the extent of causing said gathered web and its associated plastic to conform to the textured surface thereof while maintaining substantially the same uniformity of association of said plastic and said gathered web, whereby to produce a textured article in which the textured configurations thereof are of re'nforced, laminated character.

19. A molded article of complicated shape requiring for its formation plastic flow from regions of high pressure to regions of low pressure in a mold, said article having the characteristic that all parts of its construction are of laminated character, comprising a binder substance and a plurality of webs as such, at least some of said webs being characterized by minute folds characteristic of creping.

20. A molded resinous article of a shape requiring for its formation plastic flow from regions of high pressure to regions of low pressure in a mold, said article having the characteristic of a laminated construction throughout all parts, comprising webs as such, and synthetic resin, at least some of said webs being characterized by minute creping folds.

21. A molded resinous article of laminated construction and irregular surface configurations, said article being of a type requiring for its formation plastic flow from regions of high pressure to regions of low pressure in a mold, said article and said surface configurations having the characteristic throughout of a laminated construction, involving a plurality of webs as such, and synthetic resin, at least some of said webs being characterized by minute creping folds.

22. A molded laminated resinous article produced by assembling in a mold lanimae of gathered webs characterized by minute folds and capable of expanding by unfolding, and an incompletely polymerized synthetic resin substantially uniformly associated therewith, said plastic being of such nature and in sufficient quantity that, under heat and pressure, the said laminae as a whole have the property of plastic flow from regions of high pressure to regions of low pressure in a mold and pressing said laminae in a mold of substantially different configuration from said laminae, under heat, in such a way as to cause the laminae and resin bodily to flow to fill the cavity of said mold, without substantial destruction of the initial uniformity of association thereof.

23. A molded article of complicated shape requiring for its formation plastic flow from regions of high pressure to regions of low pressure in a mold, said article having the characteristic that parts of its construction which have been shaped by said plastic flow are of laminated character, comprising a binder substance and a plurality of creped webs as such, said webs having therein minute folds characteristic of creped webs but varying in different parts thereof as to the extent of said webs taken up in the said folds, said variation being the result of the plastic flow aforesaid of the laminated material.

24. The material claimed in claim 5 in which at least one of said creped webs is a web of cloth.

25. The material claimed in claim 5 in which said binder is a thermosetting synthetic resin in an incompletely polymerized condition and in which certain of said creped webs at least are webs of creped cloth.

WILLIAM WALLACE ROWE.